No. 883,870.  
PATENTED APR. 7, 1908.  
W. O. FOSS.  
SPEED CHANGING MECHANISM.  
APPLICATION FILED DEC. 5, 1907.

2 SHEETS—SHEET 1.

Witnesses:
William Phillips Jr
John B. Rutherford

Inventor
Walter O. Foss
By H. B. Schermerhorn
Attorney

No. 883,870. PATENTED APR. 7, 1908.
W. O. FOSS.
SPEED CHANGING MECHANISM.
APPLICATION FILED DEC. 5, 1907.

2 SHEETS—SHEET 2.

UNITED STATES PATENT OFFICE.

WALTER O. FOSS, OF PHILADELPHIA, PENNSYLVANIA, ASSIGNOR TO DIRECT MOTOR-DRIVE MFG. CO., OF PHILADELPHIA, PENNSYLVANIA.

SPEED-CHANGING MECHANISM.

No. 883,870.           Specification of Letters Patent.           Patented April 7, 1908.

Application filed December 5, 1907. Serial No. 405,188.

*To all whom it may concern:*

Be it known that I, WALTER O. FOSS, a citizen of the United States, residing at Philadelphia, in the county of Philadelphia and State of Pennsylvania, have invented certain new and useful Improvements in Speed-Changing Mechanisms, of which the following is a specification.

My invention relates to speed changing and reversing mechanisms and my object is to provide a device of this character, designed primarily for automobile use, wherein the mechanism for the forward speeds and for the reverse is combined and arranged in a compact, effective and novel manner. This I accomplish by the means herein described and shown in the accompanying drawings, in which—

Figure 1:
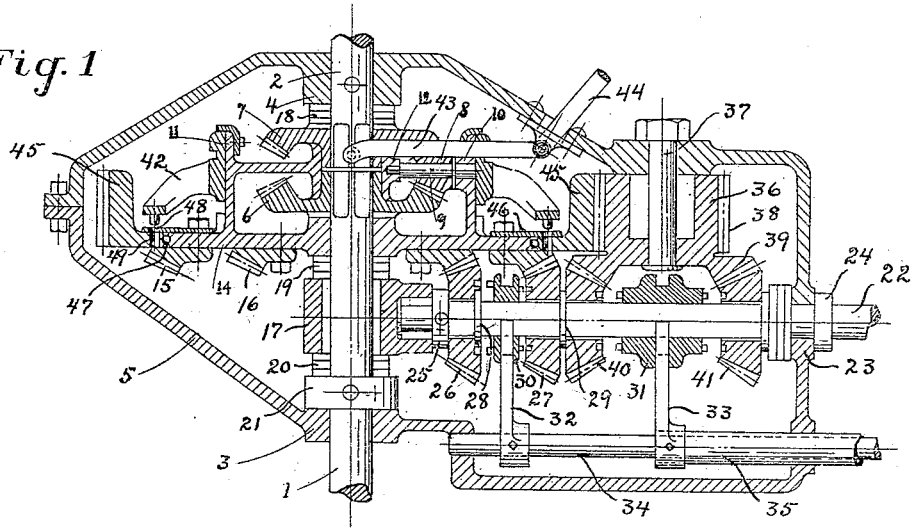
Figure 2:
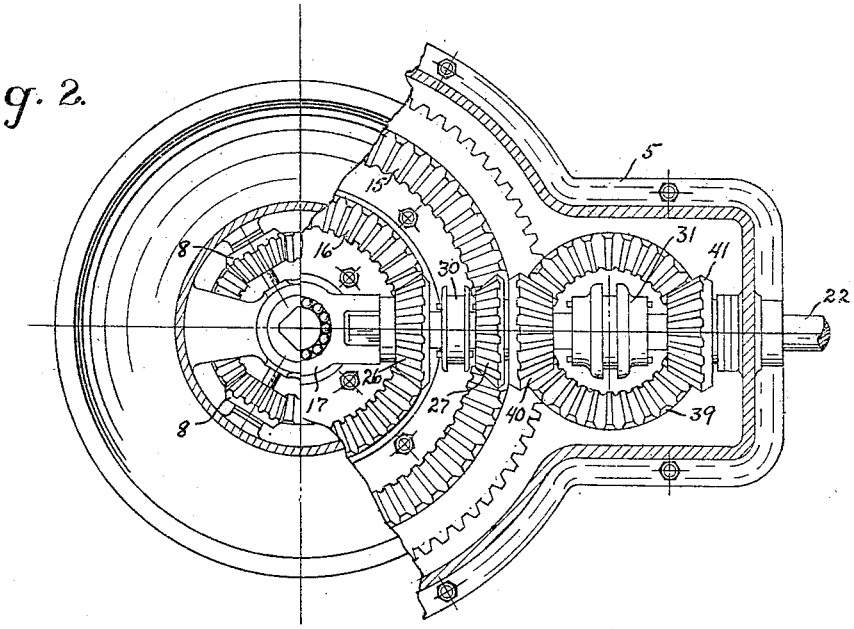
Figure 3:
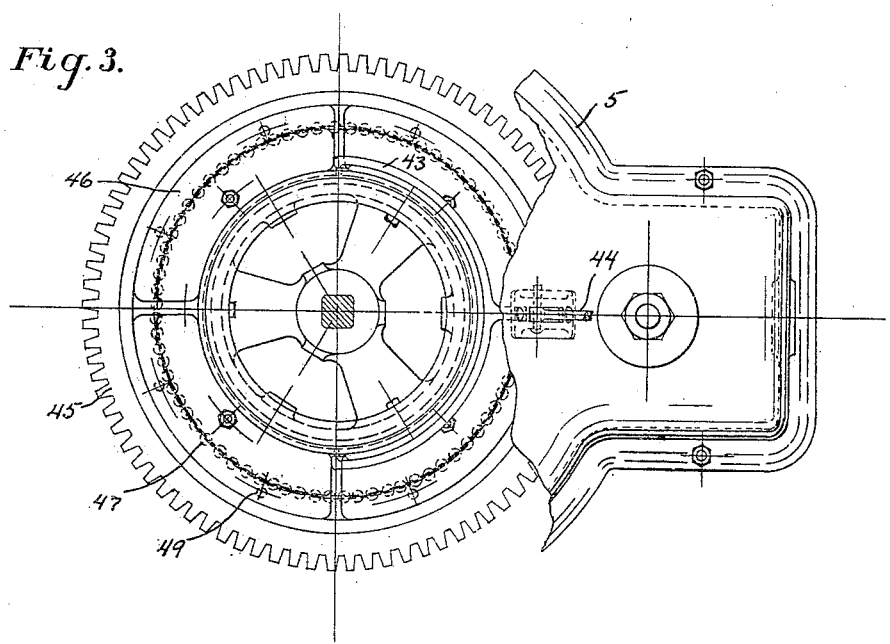

Figure 1 is a view in horizontal section of the entire mechanism inclosed by its gear casing. Fig. 2 is a view in side elevation, showing the manner in which the power shaft is geared to the driving disk and to the reversing mechanism, and Fig. 3 is a view in side elevation, showing the locking mechanism as hereinafter described.

In Fig. 1 an automobile rear axle is shown formed, in the usual manner, in two sections 1 and 2, to admit the action of the differential mechanism and provided with bearings 3 and 4 in the gear casing 5. The differential mechanism consists of the gears 6 and 7 mounted upon the squared adjoining ends of axle sections 1 and 2, and the pinions 8, which mesh into the differential gears 6 and 7. The pinions 8 are mounted upon pins 9, one end of which is carried by a bearing 10 in the cylindrical side of the differential case 11 and the other end in the bearing 12 formed in the inner web of the differential case. The differential case 11 is integral with the outer, or, as shown in Fig. 1, the upper face of the driving disk 14. The inner, or as shown in Fig. 1, the lower face of the latter is provided with the gears 15 and 16 concentrically secured thereon, and the driving disk is mounted and freely rotatable upon axle section 1, as is likewise the collar bearing 17. The washer bearings 18, 19 and 20 and the thrust collar 21 are disposed as shown in Fig. 1, in the usual manner. The power shaft 22, at the point where it enters the gear case 5 is furnished with the bearing 23 and thrust collar 24, the end of the power shaft being journaled in the collar bearing 17 and furnished with the thrust collar 25. The power shaft 22 is furnished with the bevel gears 26, 27, 40 and 41 freely rotatable thereon, the gears 26 and 27 meshing into the corresponding gears 16 and 15 concentrically arranged upon the face of the driving disk 14, constant engagement therewith being maintained by the thrust collar 25 and the collars 28 and 29, all of which are secured to the power shaft. The double faced clutches 30 and 31 are slidably keyed upon the power shaft, each clutch having sufficient play to enable both faces to be maintained out of contact with the free gears on each side. The clutches are actuated by the clutch arms 32 and 33 and clutch rods 34 and 35 in the usual manner.

The reversing mechanism consists of the reverse pinion 36 mounted upon its pin 37 in the gear case and provided with the gears 38 upon the body or barrel of the pinion and the bevel gears 39 upon its base. The bevel gears 39 mesh with the free gears 40 and 41 upon the power shaft. The four-arm clutch 42 is slidably mounted upon the cylindrical body of the differential case 11 and is adapted to be actuated by the clutch arm 43 and lever 44 as shown in Figs. 1 and 3.

The L-shaped annulus 45, Fig. 1, is mounted so as to form a continuation or extension of the driving disk 14, the base of the annulus being slidably supported between the base of the bevel gear 16 where the latter is bolted or secured to the driving disk, and the annular plate 46 which is bolted to the outer, or, as shown in Fig. 1, the upper face of the driving disk. Between the inner end of the base of the annulus and the periphery of the driving disk are located the ball-bearings 47. The outer vertical face of the annulus 45 is geared to mesh into the gear 38 on the barrel of the reverse pinion 36. The annular plate 46 is perforated by the openings 48, shown in plan in Fig. 3, and the base of the annulus 45 is similarly perforated by a corresponding number of openings 49.

Having thus described the component parts of my speed changing mechanism, I will now describe its mode of operation: The power shaft 22 being in revolution and the clutches 30 and 31 being out of engagement, as shown in Fig. 1, it is obvious that no power transmission to the driving disk and axle can take place, the bevel gears not being keyed or otherwise secured to the power shaft, but running free thereon. If now clutch 30, keyed upon and rotating with the power shaft, is thrown into engagement with bevel gear 26, the revolution of the power shaft is transmitted positively to the driving disk, this giving the highest speed forward. The differential casing and web being integral with the driving disk, the rotation of the latter is transmitted to both sections of the axle by the action of the pinions 8, which are mounted in the differential casing and carrying in rotation the gears 6 and 7. In like manner, a lower forward speed is obtained by throwing clutch 30 into positive contact with bevel gear 27.

The lowest forward speed is obtained as follows: By operating clutch lever 44 and clutch arm 43, the four-arm clutch 42 is moved down, the clutch pins passing through the perforations in the annular plate 46 and thence through the coincident perforations in the base of the annulus 45 which has meanwhile been running free in its bearings. This action of the four-arm clutch 42 locks the annulus 45 to the driving disk 14. If now the clutch 31 is brought into positive contact with bevel gear 40, a forward drive of the driving disk takes place through the reverse pinion 36. In order to reverse it is only necessary, while the four-arm clutch 42 is still in seat and clutch 30 is in the position shown in Fig. 1, to throw clutch 31 into positive contact with the bevel gear 41, whereby a positive reverse movement is communicated to the driving disk through bevel gear 41, reverse pinion 36 and the annulus 45.

What I claim as my invention and desire to secure by Letters Patent is—

1. In combination, a power shaft, a driving disk, a pinion, an annular member mounted upon and rotatable about the periphery of said driving disk and geared to said pinion, a clutch adapted to lock said annular member to said driving disk, free gears mounted upon said power shaft and geared to said pinion, and a clutch mounted on and rotating with said power shaft and adapted to positively engage either of said free gears, substantially as described.

2. In combination, a power shaft, a driving disk, a pinion, an annular member mounted upon and rotatable about the periphery of said driving disk, the periphery of said annular member being furnished with teeth engaging teeth upon said pinion and the base of said annular member being provided with clutch seats, an annular plate secured to and overlapping the periphery of said driving disk and provided with perforations coincident with said clutch seats, a clutch adapted to lock said annular member to said driving disk, free gears mounted upon said power shaft and geared to said pinion, and a clutch mounted on and rotating with said power shaft and adapted to positively engage either of said free gears, substantially as described.

3. In combination, a power shaft, a driving disk, a pinion the barrel and base of which are furnished with gears, an annular member mounted between the periphery of said driving disk and said pinion, the outer face of said annular member being furnished with teeth meshing with the teeth on the barrel of said pinion and the base of said annular member being furnished with a plurality of openings or clutch seats, an annular plate secured to and overlapping the periphery of said driving disk and furnished with a plurality of openings corresponding to said clutch seats in the annular member, a clutch the pins of which are adapted to lock said annular member to said driving disk by entering both the openings in said annular plate and those in said annular member, free gears mounted upon said power shaft and meshing with the gears on the base of said pinion, and a clutch rotating with and slidable on said power shaft and adapted to positively engage either of said free gears, substantially as described.

4. In combination, a power shaft, a driving disk furnished with a plurality of concentrically arranged gears, a plurality of free gears mounted upon said power shaft and meshing with the concentric gears on said driving disk, a double-faced clutch slidably mounted upon and rotating with said power shaft and adapted to positively engage either of said free gears, a pinion the barrel and base of which are furnished with gears, an annular member mounted between the periphery of said driving disk and said pinion, the outer face of said annular member being furnished with teeth meshing with the teeth on the barrel of said pinion and the base of said annular member being furnished with a plurality of openings or clutch seats, an annular plate secured to and over-lapping the periphery of said driving disk and furnished with a plurality of openings corresponding to said clutch seats in the annular member, a clutch the pins of which are adapted to lock said annular member to said driving disk by entering the openings in said annular plate and annular member, free gears mounted upon said power shaft and meshing with the gears on the base of said pinion, and a clutch rotating with and slidable upon said power shaft and adapted to positively engage either of said free gears, substantially as described.

In testimony whereof I hereunto affix my signature in presence of two witnesses.

WALTER O. FOSS.

Witnesses:
WILLIAM PHILLIPS, Jr.,
H. B. SCHERMERHORN.